(12) United States Patent
Sirisilla et al.

(10) Patent No.: US 9,723,132 B1
(45) Date of Patent: Aug. 1, 2017

(54) USAGE BASED AUTHENTICATION SYSTEM

(71) Applicant: Tata Consultancy Services Limited, Mumbai (IN)

(72) Inventors: Nataraj Sirisilla, Hyderabad (IN); Sowmya Togarcheti, Hyderabad (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 15/077,478

(22) Filed: Mar. 22, 2016

(30) Foreign Application Priority Data

Feb. 1, 2016 (IN) .............................. 201621003562

(51) Int. Cl.
*G06F 21/31* (2013.01)
*H04W 12/06* (2009.01)
*H04M 1/725* (2006.01)

(52) U.S. Cl.
CPC ...... *H04M 1/72577* (2013.01); *G06F 21/316* (2013.01); *H04W 12/06* (2013.01)

(58) Field of Classification Search
CPC .............................. G06F 21/316; H04W 12/06
See application file for complete search history.

(56) References Cited

U.S. PATENT DOCUMENTS

| | | |
|---|---|---|
| 2011/0164269 A1 | 7/2011 | Kamishiro |
| 2013/0318580 A1 | 11/2013 | Gudlavenkatasiva et al. |
| 2014/0113666 A1* | 4/2014 | Arvidsson ............. H04W 68/00 455/458 |
| 2014/0189829 A1 | 7/2014 | McLachlan et al. |
| 2015/0026796 A1 | 1/2015 | Alan et al. |

* cited by examiner

*Primary Examiner* — Christopher M Brandt
(74) *Attorney, Agent, or Firm* — Finnegan, Henderson, Farabow, Garrett & Dunner, L.L.P.

(57) ABSTRACT

A mechanism for providing additional layer of security to the already existing and authentication mechanism available on a mobile device is provided. According to an embodiment, the system comprises a usage authentication interface (114) that displays one or more mobile software applications for usage based authentication, wherein the usage based authentication interface allows the user to select one or more software applications for usage based authentication. The usage pattern computing module (116) calculates plurality of usage statistics for one or more selected mobile software applications by user wherein usage statistic comprises a set of calculated value. The usage bracket matrix stores one or more usage patterns which comprise plurality of calculated values generated by the usage pattern computing module (116). An authentication application module (118) authenticates user to log on to the mobile device based on successful matching of patterns stored in usage bracket matrix with user-fed usage pattern.

11 Claims, 6 Drawing Sheets

Data Collection matrix

| Application / Data values | Total usage of application in hours | Number of application launches | Longest duration in hours |
|---|---|---|---|
| A1 | 3 | 10 | 0.5 |
| A2 | 6 | 20 | 1 |
| A3 | 5.8 | 40 | 7 |

Parameter matrix

| Application / Parameters | p1 | p2 | p3 |
|---|---|---|---|
| A1 | 12.5 | 5 | 0.5 |
| A2 | 25 | 10 | 1 |
| A3 | 24.16666667 | 2.9 | 7 |

Rank matrix

| Application / Ranks | r1 | r2 | r3 |
|---|---|---|---|
| A1 | 6 | 5 | 5 |
| A2 | 4 | 4 | 3 |
| A3 | 5 | 3 | 2 |

Weighted Rank matrix

| Application / Weighted Ranking | W(r1) | W(r2) | W(r3) |
|---|---|---|---|
| A1 | 360 | 50 | 150 |
| A2 | 240 | 40 | 90 |
| A3 | 300 | 30 | 60 |

T1

| Application/ Usage Numbers | UN (Usage Numbers) | Usage Brackets | Use based matrix |
|---|---|---|---|
| A1 | 5.7 | low | |
| A2 | 3.6 | medium | |
| A3 | 3.9 | medium | |

T2

| Application/ Usage Numbers | UN (Usage Numbers) | Usage Brackets | Use based matrix |
|---|---|---|---|
| A1 | 5.7 | low | |
| A2 | 3.6 | medium | |
| A3 | 3.9 | medium | |

T3

| Application/ Usage Numbers | UN (Usage Numbers) | Usage Brackets | Use based matrix |
|---|---|---|---|
| A1 | 5.7 | low | |
| A2 | 3.6 | medium | |
| A3 | 3.9 | medium | |

Constants

| | Wave in Hours |
|---|---|
| Constants | Total number of application launches |
| | p1 Weight (w1) |
| | p2 Weight (w2) |
| | p3 Weight (w3) |

FIG. 4

USAGE BASED AUTHENTICATION SYSTEM

PRIORITY CLAIM

This U.S. patent application claims priority under 35 U.S.C. §119 to: India Application No. 201621003562, filed on Jan. 2, 2016. The entire contents of the aforementioned application are incorporated herein by reference.

TECHNICAL FIELD

This disclosure relates generally to enhancing authentication on a mobile device, and more particularly to methods and systems for providing an additional layer of security on the mobile device.

BACKGROUND

The world is now "mobile" in a "smart" way. Everyone's life revolves around a smartphone and they stay "connected" through the smartphone. Virtual connectivity is now of prime importance to get connected and to access the internet. With this level of connectivity, one can imagine the amount of data that is exchanged and personal data that is stored in a device. Therefore, more the personal data on the mobile device, more it becomes important to protect the same from unintended users or unauthorized users using the mobile.

The world is now "mobile" in a "smart" way. Everyone's life revolves around a smartphone and they stay "connected" through the smartphone. Virtual connectivity is now of prime importance to get connected and to access the internet. With this level of connectivity, one can imagine the amount of data that is exchanged and personal data that is stored in a device. Therefore, more the personal data on the mobile device, more it becomes important to protect the same from unintended users or unauthorized users using the mobile.

The inventors here have recognized several technical problems with such conventional systems, Often several mobile software applications are downloaded on the smartphone. However, there are only certain numbers of apps that are used frequently on a daily basis. Each user has a unique pattern when it comes to usage of the applications on their smartphones and it is only known to that user.

Therefore, this mobile application usage pattern which is unique and which is only known to the user can be leveraged to develop a secure supplementary authentication system.

SUMMARY

Embodiments of the present disclosure present technological improvements as solutions to one or more of the above-mentioned technical problems recognized by the inventors in conventional systems. For example, in one embodiment, a method for supplementary authentication by user on a mobile device. Initially, the mobile device is enabled with a usage based supplementary authentication software mechanism. When the user selects to enable the supplementary authentication on the mobile, the mobile device displays the list of mobile applications and allows the user to select one or more applications. At the next step, the usage statistics of the selected mobile applications are calculated by a usage pattern computing module. These usage patterns comprise a set of calculated values stored in usage bracket matrix. At the next step, a plurality of usage patterns is generated by the usage pattern computing module. These usage patterns are stored in a memory. At the next step, the mobile device provides a usage based authentication interface to the user, displaying the list of mobile applications that have been selected for supplementary authentication. The user provides the usage pattern as input in this interface. The usage bracket matrix stores one or more calculated values generated by the usage pattern computing module. At the next step, a user-fed usage pattern is enabled through an I/O interface. The user-fed usage pattern is matched with one or more usage patterns stored in usage bracket matrix. Finally the mobile device is authenticated based on successful matching of usage pattern in usage bracket matrix with one or more user-fed usage patterns as input. If the matching fails, the user will not be authenticated to the system.

In another embodiment, a computer implemented system for authenticating user in a mobile device is provided. The system includes a memory, a hardware processor, an I/O interface, and one or more computing modules. The computing modules further comprise an identification module, a usage authentication interface, a usage pattern commuting module and an authentication applications module. The identification module (112) facilitates identification of one or more mobile software applications for usage computation. A usage based authentication software application is enabled in the mobile device to select one or more mobile applications which are to be a part of supplementary authentication. The usage authentication interface displays the mobile applications installed on the device and that are configured to be a part of usage based authentication. The usage pattern computing module calculates usage pattern for one or more selected mobile applications. The usage pattern comprises a set of calculated values. The usage patterns are stored in a memory. The usage bracket matrix stores one or more calculated values generated by the usage pattern computing module. The I/O interface is enabled for the user to enter a usage pattern, wherein the I/O user-fed usage pattern is matched with one or more usage patterns stored in usage bracket matrix. Finally, the system authenticates the mobile device based on successful matching of usage pattern in usage bracket matrix with one or more user-fed usage patterns as input. If the matching fails, the user will not be authenticated to the mobile device.

In yet another embodiment, a non-transitory computer readable medium comprising thereon instruction which when executed by a possessor on a system, cause the processor to perform a method comprising enabling the mobile application for usage based authentication computation by a usage authentication interface (114); calculating usage statistics for one or more selected mobile applications by a usage pattern computing module (116), wherein usage statistic comprises a set of calculated values. Generating the usage pattern for the one or more selected mobile applications by a usage pattern computing module (116), wherein the usage pattern are stored in a memory (102). Storing the one or more usage pattern in the usage bracket matrix, wherein the usage bracket matrix stores one or more calculated values generated by the usage pattern computing module (116). Enabling the user to enter a usage pattern through an I/O interface (106) wherein the user-fed usage pattern is matched with one or more usage patterns stored in the usage bracket matrix; and authenticating the user by a authentication applications module (118) to log on to the mobile device based on successful matching of usage pattern in usage bracket matrix with one or more user-fed usage patterns as input.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 shows an illustrative use of the configuring one or more parameter to create usage pattern, wave "w", with respect to time "t".

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
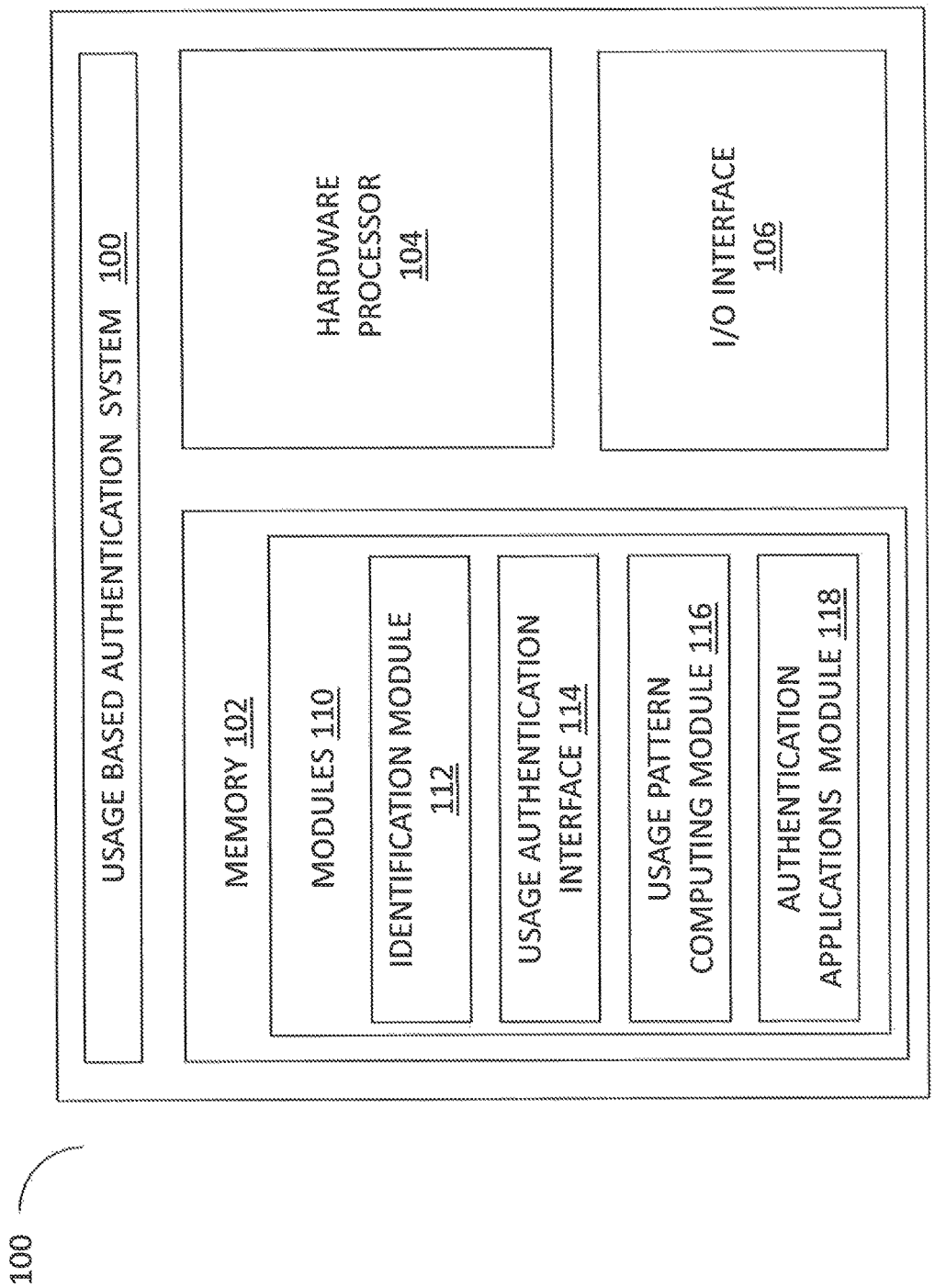
FIG. 1 shows a system diagram illustrating architecture of a system for usage based authentication system in a mobile device in accordance with an embodiment of the invention.

FIG. 1 illustrates a schematic block diagram of a system (100) for authenticating a user for a mobile device by utilizing the usage statistics of one or more mobile software applications according to an illustrative embodiment of the present invention.

According to an embodiment of the invention, the system (100) comprises a memory (102), a hardware processor (104) with I/O interface (106) and one or more computing modules (110) as shown in FIG. 1. The memory (102), may store instructions, any number of pieces of information, and data, used by a computer system, for example the usage based authentication system (100) to implement the functions (or embodiments) of the present disclosure. The memory (102) may include for example, volatile memory and/or non-volatile memory.

Additionally or alternatively, the memory (102) may be configured to store instructions which when executed by the hardware processor (104) causes the usage based authentication system (100) to behave in a manner as described in various embodiments (e.g., selecting one or more mobile applications, enabling usage based authentication, calculating usage statistics, storing one or more usage patterns, matching one or more user-fed usage patterns). The memory (102) stores information, for example usage pattern, usage number etc. wherein the usage pattern is computed by usage pattern computation module (116).

The hardware processor (104) may be implemented as one or more microprocessors, microcomputers, microcontrollers, digital signal processors, central processing units, state machines, logic circuitries, and/or any devices that manipulate signals based on operational instructions. Further, the hardware processor (104) may comprise a multi-core architecture. Among other capabilities, the hardware processor (104) is configured to fetch and execute computer-readable instructions or modules stored in the memory (102). The hardware processor (104) may include circuitry implementing, among others, audio and logic functions associated with the communication. For example, the hardware processor (104) may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The computing module (110) further comprises an identification module (112), a usage authentication interface (114), a usage pattern computing module (116) and an authentication applications module (118) according to an embodiment of the invention, as shown in FIG. 1.

According to an embodiment of the invention, the memory (102) stores instructions for software application usage in a mobile device. The identification module (112) facilitates identification of one or more mobile software applications for usage computation. The usage authentication interface (114) displays one or more mobile software applications and allows the user to select one or more of these applications for computation. The usage pattern computing module (116) calculates the usage statistics for one or more selected mobile software applications by user wherein the usage statistics comprise a set of calculated values. The usage bracket matrix stores one or more usage patterns wherein the pattern comprises a set of one or more calculated values that are computed by the usage pattern computing module (116).

Figure 2:
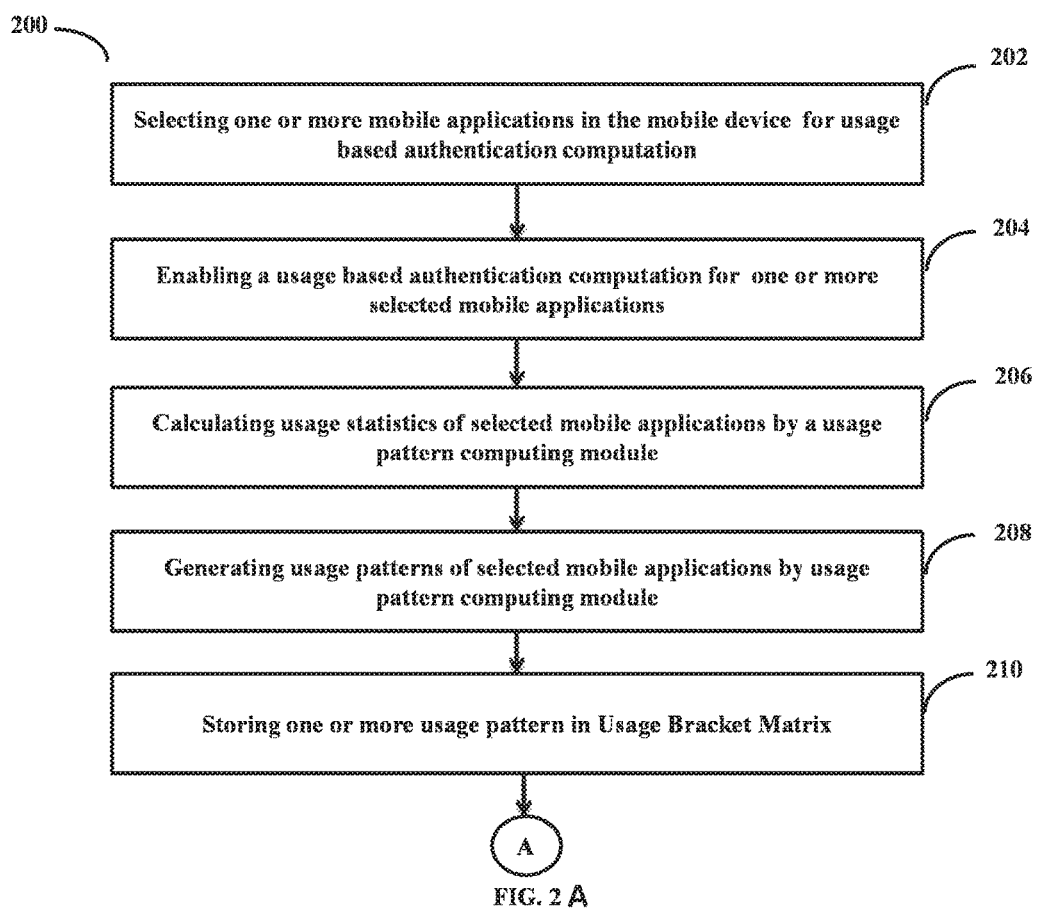
FIGS. 2A and 2B show a flow diagram illustrating steps involved in authenticating the user to access the mobile software in accordance with an embodiment of the invention.
Figure 2B:
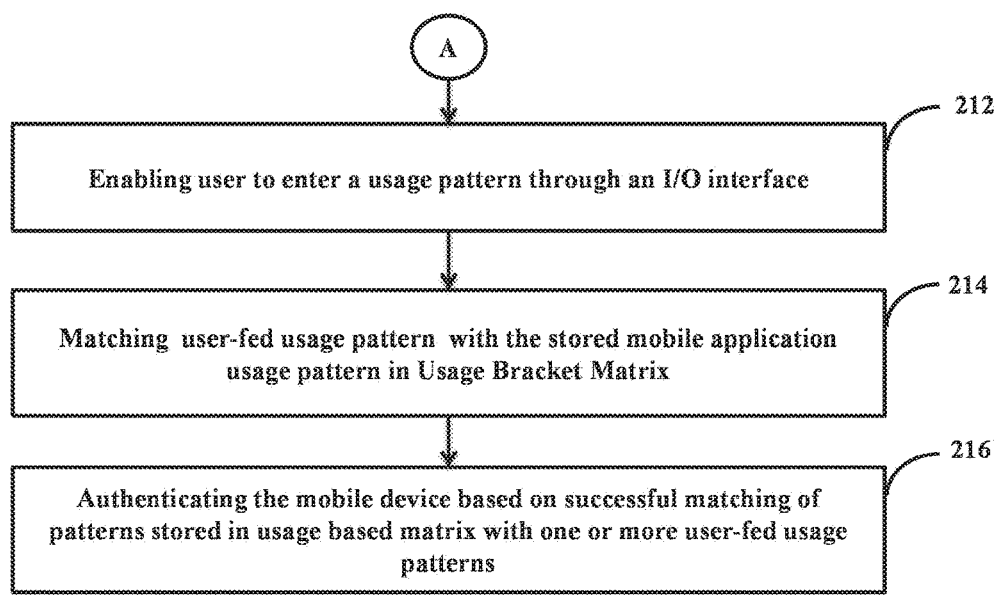

FIG. 2A illustrates a flowchart 200 indicating the steps performed within authentication computing module (110). At step (202), one or more mobile applications are selected by the user in the mobile device for usage based authentication computation. At step (204), the usage authentication interface (114) displays the various mobile applications and the usage based authentication computation is enabled for the selected applications in step (202). At step (206), usage statistics are calculated for one or more selected mobile software applications by a usage pattern computing module (116) that comprises a set of calculated values as pre-defined parameters. At step (208), one or more usage patterns are generated for the selected mobile applications. At step (210), the usage patterns are stored in a usage bracket matrix. At step (212), a usage pattern is entered by the user through the I/O interface (106). At step (214), the user-fed pattern is matched with the stored mobile application usage pattern in usage bracket matrix. And finally at step (216), the mobile device is authenticated based on successful matching of pattern stored in the usage bracket matrix with one or more user-fed usage patterns. If the matching fails, the user will not be authenticated to the mobile device.

One or more components of the invention are described as module for the understanding of the specification. For example, for one or more mobile software applications which are downloaded on a smartphone can be configured for usage based authentication, wherein user can select and enable this application to be a part of supplementary authentication mechanism. The user can select a set of most used mobile software application (for example, top 10 most used mobile software applications installed in the user's mobile) as part of usage based supplementary authentication mechanism. Based on the selection, the mobile device authentication process begins. The usage statistics of the plurality of mobile software applications are calculated based on the parameters, wherein the parameters are stored in the usage bracket matrix. When the user enters a usage pattern as input, the user input is matched with the existing statistics in the usage bracket matrix. On successful matching of patterns, the user will be authenticated to the mobile device. If the matching fails, the user will not be authenticated to the mobile device. The usage bracket matrix calculation is shown below in Table 1:

TABLE 1

Usage Bracket Matrix

| Application | UN (Usage Number) | Usage Bracket |
|---|---|---|
| A1 | 5.6 | low |
| A2 | 3.7 | Medium |
| A3 | 3.9 | Medium |
| A4 | 3.8 | Medium |
| A5 | 3 | High |
| A6 | 1 | High |

A user interface screen is displayed on the mobile device after the successful primary authentication. The plurality of mobile software applications are displayed to the user, wherein the mobile software applications are configured for usage based authentication. The user input pattern is matched with the pattern stored in the usage bracket matrix. The usage based authentication succeeds based on the successful match. If the matching fails, the user will not be authenticated to the mobile device. An illustrative use of the usage pattern for plurality of mobile software applications (e.g. up to 10 applications) is shown as below:

Enter Usage Pattern

| | High | Medium | Low |
|---|---|---|---|
| App 1 | ✓ | | |
| App 2 | | ✓ | |
| App 3 | ✓ | | |
| App 4 | | ✓ | |
| App 5 | | | ✓ |
| App 6 | ✓ | | |
| App 7 | | | ✓ |
| App 8 | | | ✓ |
| App 9 | | ✓ | |
| App 10 | ✓ | | |

Figure 3A:
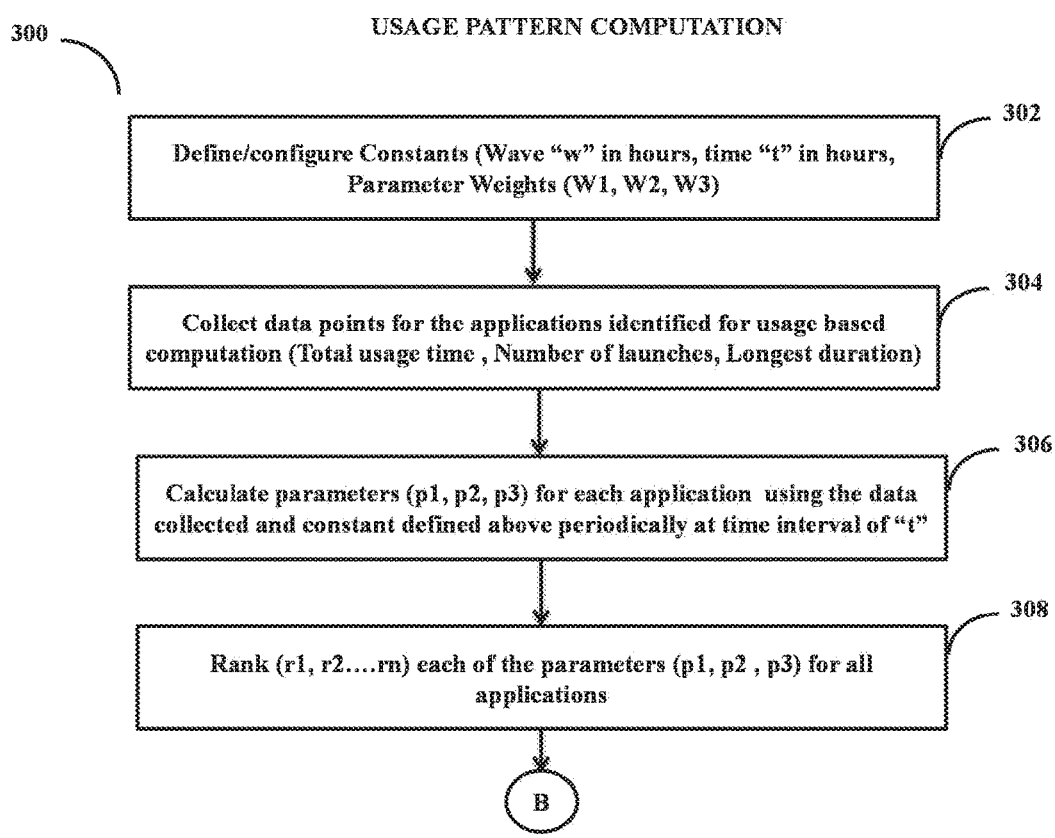
FIGS. 3A and 3B show a flowchart illustrating usage pattern computation while creating additional layer of security in a mobile device which is the currently preferred embodiment of the system in accordance with an embodiment of the invention.
Figure 3B:
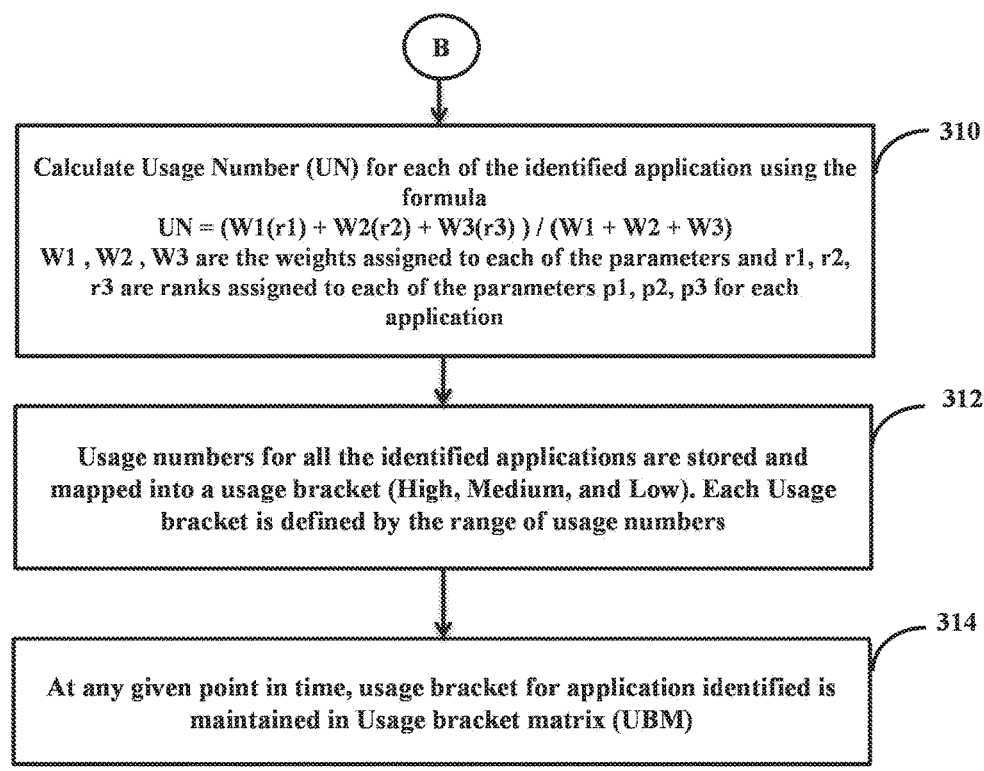

FIG. 3A illustrates the logic for usage pattern computation. According to an embodiment of the invention, at the step (302), a usage pattern is configured to define one or more constants. The constraint comprises a wave "w" (in hours), time "t" (in hours), and parameter weights (W1, W2, W3). One or more data points are collected related to the usage of the applications identified for usage computation. The data points comprise total usage time of each of the mobile application, number of times one or more a mobile application is launched and the longest duration of one or more mobile application launched. The identified applications are referred as A1, A2, . . . An. At the step (306), one or more parameters are calculated for one or more mobile applications using the collected data points at a periodically at time interval of "t". The set of parameter comprises a usage percentage (p1). The p1 is calculated as the total time spent in hours in a wave multiplied by 100 (p1=(Total Time spent on app (in hours) in a wave/w)*100). The application launch frequency percentage (p2) is calculated by number of times the mobile software application is launched in a wave divided by total number of all applications launches in a wave multiply by 100 (p2=(Number of times the application are launched in a wave/Total number of all applications launches in a wave)*100). A longest active duration for the applications (p3) wherein p3 indicates longest duration of active applications usage in a single session. At the step (308), one or more parameters are ranked from 1 to n, wherein "n" being the application count of one or more identified mobile software applications. At the step (310), a usage number (UN) is calculated of one or more mobile applications at any point in time during a wave. The usage number for an identified mobile software application during the wave is calculated using a formula. The formula comprises one or more weights (W1, W2, W3) and one or more ranks (r1, r2, . . . rn). W1, W2, W3 are the weights assigned to each of the parameters and r1, r2, r3 are ranks assigned to each of the parameters p1, p2, p3 for each application. At the step (312), the usage numbers for all the identified applications are stored and mapped into the usage bracket matrix. The usage bracket matrix comprises one or more classifications. The classification comprises high, medium, and low. The usage bracket is defined by the range of the usage numbers. One or more range is assigned to define the classification. The classification 'low' indicates the range from UN=5 to 10, the medium indicated the range form UN=3 to 5 and the high indicates the range form UN=1 to 3. At the step (314), the usage bracket for one or more applications identified is maintained in the usage bracket matrix. An illustrative use of the configuring one or more parameter to create usage pattern, wave "w", with respect to time "t", is shown in FIG. 4.

In view of the foregoing, it will be appreciated that the present invention provides a method and system for authentication by user on a mobile device. Wherein the invention is more specific to creating an additional layer of security supplementing on a mobile device. Still, it should be understood that the foregoing relates only to the exemplary embodiments of the present invention, and that numerous changes may be made thereto without departing from the spirit and scope of the invention as defined by the following claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer implemented method for authenticating a user using one or more mobile applications in a mobile device, the method comprising:
    selecting one or more mobile applications in the mobile device by the user, for a usage bracket matrix computation wherein a usage based authentication software application is enabled in the mobile device;
    enabling the mobile application for usage based authentication computation by a usage authentication interface (114);
    calculating usage statistics for one or more selected mobile applications by a usage pattern computing module (116), wherein usage statistic comprises a set of calculated values;
    generating the usage pattern for the one or more selected mobile applications by a usage pattern computing module (116), wherein the usage pattern are stored in a memory (102);
    storing the one or more usage pattern in the usage bracket matrix, wherein the usage bracket matrix stores one or more calculated values generated by the usage pattern computing module (116);
    enabling the user to enter a usage pattern through an I/O interface (106) wherein the user-fed usage pattern is matched with one or more usage patterns stored in the usage bracket matrix; and
    authenticating the user by a authentication applications module (118) to log on to the mobile device based on successful matching of usage pattern in usage bracket matrix with one or more user-fed usage patterns as input.

2. The method according to claim 1, wherein the usage pattern computing module (116) further configured to perform the steps of:
    configuring one or more parameter to create usage pattern, wherein the parameter comprises a wave "w", a time "t" and one or more weights "W";
    collecting a set of data points for the mobile software application for one or more usage based authentication computation;
    defining/configuring the Constants Wave "w" in hours, time "t" in hours, and Parameter Weights as (W1, W2, W3);
    collecting data points for the applications identified for usage based computation using total usage time, number of launches and longest duration);
    calculating a set of usage pattern parameters (p1, p2, p3) for each application using the data collected and constant defined above periodically at time interval of "t";
    evaluating rank (r1, r2, . . . rn) of one or more mobile software application with the set of the usage pattern parameters (P1, P2, . . . Pn);
    calculating a usage number of one or more software applications, wherein the usage number is calculated using plurality of weights (W1, W2, . . . Wn), plurality of parameters (P1, P2, . . . Pn) and plurality of ranks (r1, r2, . . . rn); and
    storing and mapping one or more usage numbers with the usage bracket, wherein the usage bracket is defined by a range of usage numbers.

3. The method according to claim 1, wherein the usage based authentication identifies a set of mobile software applications to calculate the usage frequency of the mobile software applications by the user.

4. The method according to claim 1, wherein the usage pattern parameter for each mobile software application further performing the steps of;
    calculating a usage percentage (p1), wherein the usage percentage (p1) is calculated by total time spent on one or more mobile software application (in hours) in a wave/w)*100;
    calculating the application launch frequency percentage (p2), wherein the application launch frequency percentage (p2) is calculated by number of times one or more mobile software application is launched in a wave/Total number of one or more mobile software application launches in a wave)*100; and
    calculating a longest Active Duration (p3) for the one or more mobile software application, wherein longest Active Duration (p3) indicates the longest duration usage of the one or more mobile software application in a single session.

5. The method according to claim 2, wherein the usage statistics comprises one or more mobile software applications, one or more usage number, wherein the usage number is calculated for an identified mobile software application during a wave using formula UN=(W1(r1)+W2(r2)+W3(r3))/(W1+W2+W3).

6. The method according to claim 2, wherein the usage statistics comprises one or more mobile software applications, one or more usage Bracket, wherein usage bracket is configured to determine the usage bracket of mobile software application usage as high, medium and low, wherein a range from 5 to 10 is defined for low level, wherein 3 to 5 is defined for medium and wherein 1 to 3 is defined for high.

7. The method according to claim 2, wherein one or more parameters (P1, P2 . . . Pn) are ranked (r1, r2, . . . rn) based on one or more calculated values.

8. A system for authenticating a user in a mobile device, the system comprising:
    a memory storing instructions;
    a processor coupled to the memory, wherein the processor further comprises:

an identification module (112) to select one or more mobile applications in the mobile device by the user, wherein a usage based authentication software application is enabled in the mobile device;

a usage authentication interface (114), to display and select the mobile applications to compute usage based authentication;

a usage pattern computing module (118) to calculate usage pattern for one or more selected mobile applications, wherein usage pattern comprises a set of calculated values;

a usage bracket matrix, wherein the usage bracket matrix stores one or more calculated values generated by the usage pattern computing module (118); an I/O interface (108) to enable user to enter a usage pattern, wherein the user-fed usage pattern is matched with one or more usage pattern stored in usage bracket matrix; and an authentication applications module (118), wherein the authentication applications module (118) allows user to log on to the mobile device based on successful matching of usage pattern in usage bracket matrix with one or more user-fed usage patterns as input, if the matching fails, the user will not be authenticated to the mobile device.

9. A non-transitory computer readable medium comprising thereon instruction which when executed by a possessor on a system, cause the processor to perform a method comprising:

selecting one or more mobile applications in the mobile device by the user, for a usage bracket matrix computation wherein a usage based authentication software application is enabled in the mobile device;

enabling the mobile application for usage based authentication computation by a usage authentication interface (114);

calculating usage statistics for one or more selected mobile applications by a usage pattern computing module (116), wherein usage statistic comprises a set of calculated values;

generating the usage pattern for the one or more selected mobile applications by a usage pattern computing module (116), wherein the usage pattern are stored in a memory (102);

storing the one or more usage pattern in the usage bracket matrix, wherein the usage bracket matrix stores one or more calculated values generated by the usage pattern computing module (116);

enabling the user to enter a usage pattern through an I/O interface (106) wherein the user-fed usage pattern is matched with one or more usage patterns stored in the usage bracket matrix; and authenticating the user by a authentication applications module (118) to log on to the mobile device based on successful matching of usage pattern in usage bracket matrix with one or more user-fed usage patterns as input.

10. The non-transitory computer readable medium according to claim 9 further storing instructions when executed by a possessor on a system, cause the processor to perform method comprising:

configuring one or more parameter to create usage pattern, wherein the parameter comprises a wave "w", a time "t" and one or more weights "W";

collecting a set of data points for the mobile software application for one or more usage based authentication computation;

defining/configuring the Constants Wave "w" in hours, time "t" in hours, and Parameter Weights as (W1, W2, W3);

collecting data points for the applications identified for usage based computation using total usage time number of launches and longest duration);

calculating a set of usage pattern parameters (p1, p2, p3) for each application using the data collected and constant defined above periodically at time interval of "t";

evaluating rank (r1, r2, . . . rn) of one or more mobile software application with the set of the usage pattern parameters (P1, P2, . . . Pn);

calculating a usage number of one or more software applications, wherein the usage number is calculated using plurality of weights (W1, W2, . . . Wn), plurality of parameters (P1, P2, . . . Pn) and plurality of ranks (r1, r2, . . . rn); and storing and mapping one or more usage numbers with the usage bracket, wherein the usage bracket is defined by a range of usage numbers.

11. The non-transitory computer readable medium according to claim 9 further storing instructions when executed by a possessor on a system, cause the processor to perform method comprising:

calculating a usage percentage (p1), wherein the usage percentage (p1) is calculated by total time spent on one or more mobile software application (in hours) in a wave/w)*100;

calculating the application launch frequency percentage (p2), wherein the application launch frequency percentage (p2) is calculated by number of times one or more mobile software application is launched in a wave/Total number of one or more mobile software application launches in a wave)*100; and calculating a longest Active Duration (p3) for the one or more mobile software application, wherein longest Active Duration (p3) indicates the longest duration usage of the one or more mobile software application in a single session.

* * * * *